Patented Mar. 12, 1940

2,193,654

UNITED STATES PATENT OFFICE 2,193,654

ACCELERATOR OF VULCANIZATION

Waldo L. Semon, Silver Lake, Ohio, assignor to The B. F. Goodrich Company, New York, N. Y., a corporation of New York No Drawing. Application September 15, 1937, Serial No. 163,989

12 Claims. (Cl. 260—793)

This invention relates to the art of rubber manufacture and has as its chief object to provide a new and improved class of accelerators of vulcanization.

Derivatives of dithiocarbamic acids, particularly dialkyl dithiocarbamates were among the first known organic accelerators. The free acids were never used, however, because of their instability. Oily layers believed to be free dialkyl dithiocarbamic acids have been precipitated from dithiocarbamic salt solutions, but these substances decomposed into carbon disulfide and the free amines so readily, either by heating gently or merely by allowing them to stand for a short time at ordinary temperatures, that they could not even be tested as accelerators.

I have discovered, however, that not only may the free diaryl dithiocarbamic acids be prepared as crystalline compounds of definite melting point, but they are excellent accelerators of vulcanization. The process of this invention consists in vulcanizing rubber in the presence of free diaryl dithiocarbamic acids. For instance, diphenyl dithiocarbamic acid or the similar ditolyl (ortho, meta, para or mixed), dinaphthyl (alpha, beta or mixed), dixenyl, phenyl-naphthyl, phenyl-xenyl, phenyl-cumyl, di-p-nitrophenyl, di-2,4-dinitrophenyl, di-p-chlorphenyl, phenyl - m - bromphenyl, di - p-hydroxyphenyl, phenyl-p-hydroxyphenyl, phenyl-p-phenyloxyphenyl, phenyl-p-anilinophenyl, di - o - anisyl, phenyl-p-methylaminophenyl, phenyl-p-acetylamidophenyl, or other like diaryl dithiocarbamic acids are all excellent accelerators. The term aryl is therefore to be understood as designating both unsubstituted and substituted monovalent radicals containing an aromatic carbocyclic ring with the free valence on a nuclear carbon atom unless it is specifically limited to hydrocarbon aryl groups, but as excluding cyclic groups which are not aromatic in character such as cycloaliphatic groups. The diarylarylene bis dithiocarbamic acids such as diphenylphenylene bis dithiocarbamic acid are also included in the generic term diaryl dithiocarbamic acid.

The free diaryl dithiocarbamic acids are very readily prepared by several methods. One of the most convenient comprises slightly acidifying a metallic diaryl dithiocarbamate solution and purifying the crystalline precipitate. Thus phenyl-beta-naphthyl dithiocarbamic acid with a melting point of 143° C. may be prepared by slightly acidifying a sodium phenyl-beta-naphthyl dithiocarbamate solution. Diphenyl dithiocarbamic acid having a melting point of 140° C. may be prepared from the corresponding metal salt by the same method.

As a specific example of one embodiment of the method of this invention, a rubber composition is prepared by mixing rubber 100 parts by weight, zinc oxide 5 parts, stearic acid 1 part, sulfur 3.5 parts, and phenyl-beta-naphthyl dithiocarbamic acid 0.5 part. When this composition is cured in a press for 20 minutes at 260° F., a well-vulcanized product having a tensile strength of 3120 lbs. per sq. in. and the high elongation of 895% is produced. This compound has little tendency to overcure, vulcanization for 60 minutes at the same temperature producing substantially the same tensile strength and elongation. The good tensile strength and very high elongation developed by cures with these free acids in general make them very good accelerators for use in thread rubber where these properties are essential. Similar excellent results are obtained by using phenyl-beta-naphthyl dithiocarbamic acid, phenyl-alpha-naphthyl dithiocarbamic acid, or indeed any member of the class heretofore defined.

It is to be understood that the specific examples given above are merely illustrative of one manner of use of the accelerators of this invention; that other accelerators within the scope of the class herein defined may be substituted for the specific compounds used in the example; that the accelerators of this invention may be used to vulcanize rubber broadly including caoutchouc, balata, gutta-percha or synthetic rubber; that the accelerators may be incorporated in the rubber by mastication, milling, or other suitable methods; that the accelerators may be used in admixture with each other or other known accelerators, or with antioxidants, organic acids, amines, softeners, activators, pigments, fillers, etc.; and that the rubber may be vulcanized with the assistance of this new class of accelerators in other manners than that particularly set forth above; specifically, it may be vulcanized in metal molds, in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of a diaryl dithiocarbamic acid.
2. The process which comprises vulcanizing rubber in the presence of a di(hydrocarbon-aryl) dithiocarbamic acid.
3. The process which comprises vulcanizing rubber in the presence of phenyl aryl dithiocarbamic acid.
4. The process which comprises vulcanizing rubber in the presence of diphenyl dithiocarbamic acid.
5. The process which comprises vulcanizing rubber in the presence of phenyl-alpha-naphthyl dithiocarbamic acid.
6. The process which comprises vulcanizing rubber in the presence of phenyl-beta-naphthyl dithiocarbamic acid.
7. The process which comprises heating a mixture of rubber, sulfur, and a diaryl dithiocarbamic acid.
8. A rubber composition which has been vulcanized in the presence of a di(hydrocarbon-aryl) dithiocarbamic acid.
9. A rubber composition which has been vulcanized in the presence of a diaryl dithiocarbamic acid.
10. A rubber composition which has been vulcanized in the presence of diphenyl dithiocarbamic acid.
11. A rubber composition which has been vulcanized in the presence of phenyl-alpha-naphthyl dithiocarbamic acid.
12. A rubber composition which has been vulcanized in the presence of phenyl-beta-naphthyl dithiocarbamic acid.

WALDO L. SEMON.